Dec. 10, 1946.  W. L. NEWELL  2,412,417
ART OF RAISING SUNKEN VESSELS
Filed April 5, 1943  10 Sheets-Sheet 2

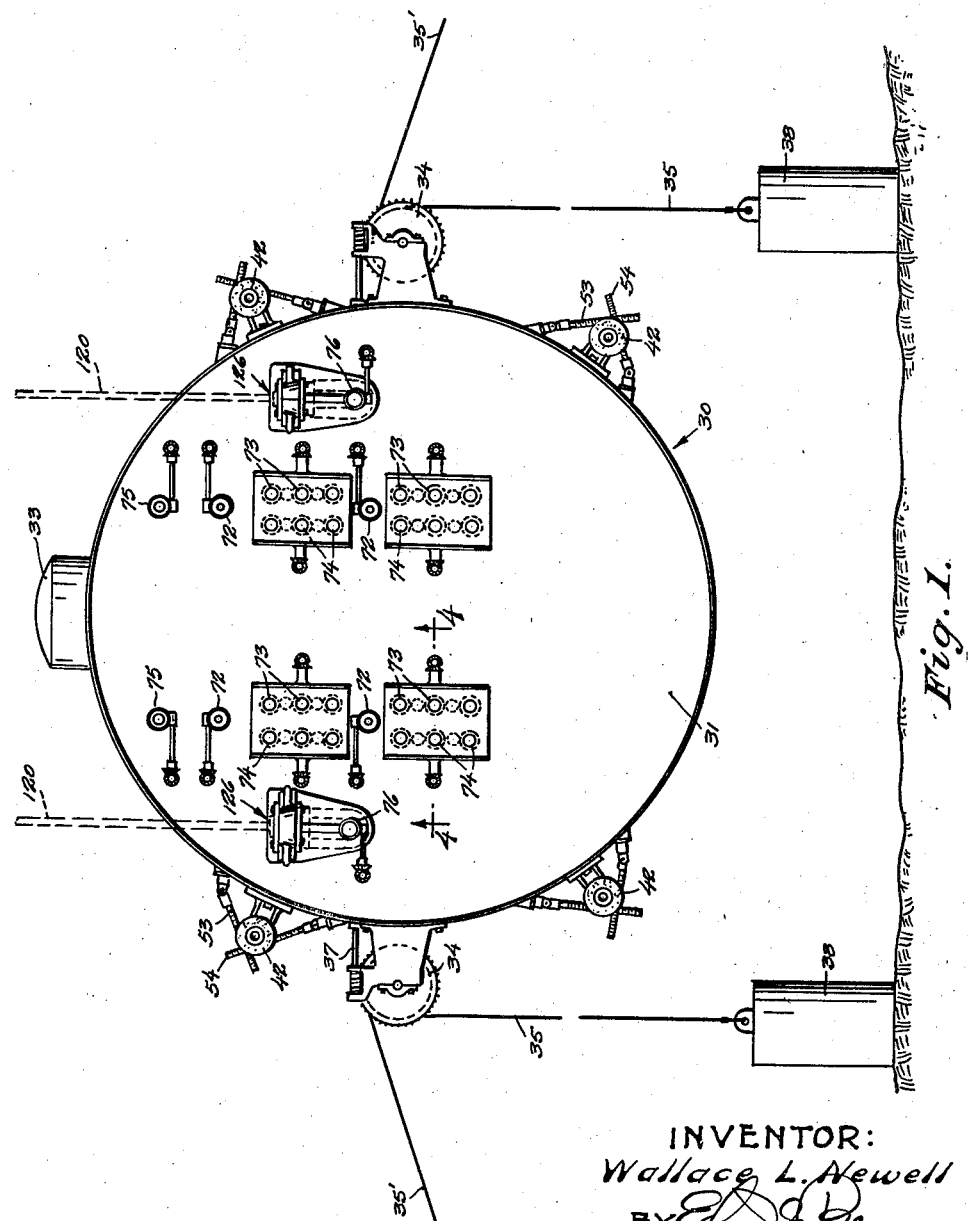

INVENTOR:
Wallace L. Newell
BY
ATTORNEY.

Dec. 10, 1946.  W. L. NEWELL  2,412,417
ART OF RAISING SUNKEN VESSELS
Filed April 5, 1943  10 Sheets-Sheet 3

INVENTOR:
Wallace L. Newell
ATTORNEY.

Dec. 10, 1946.    W. L. NEWELL    2,412,417
ART OF RAISING SUNKEN VESSELS
Filed April 5, 1943    10 Sheets-Sheet 4

INVENTOR:
Wallace L. Newell
BY
ATTORNEY

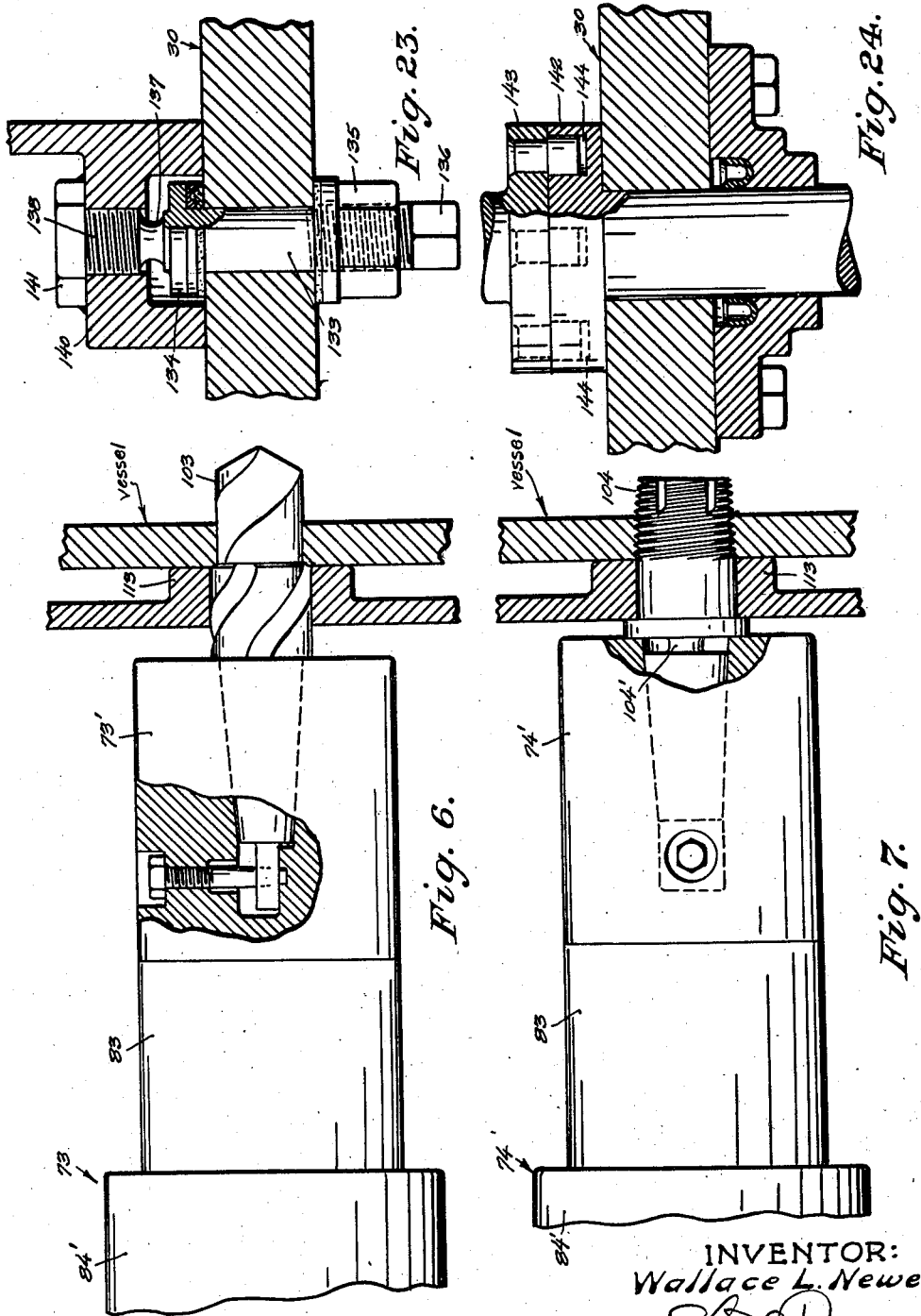

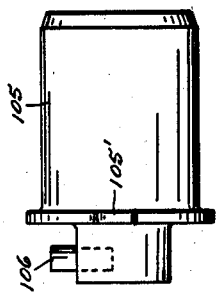
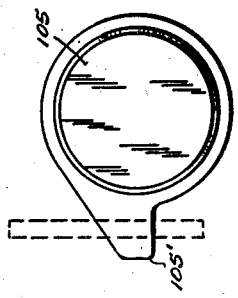
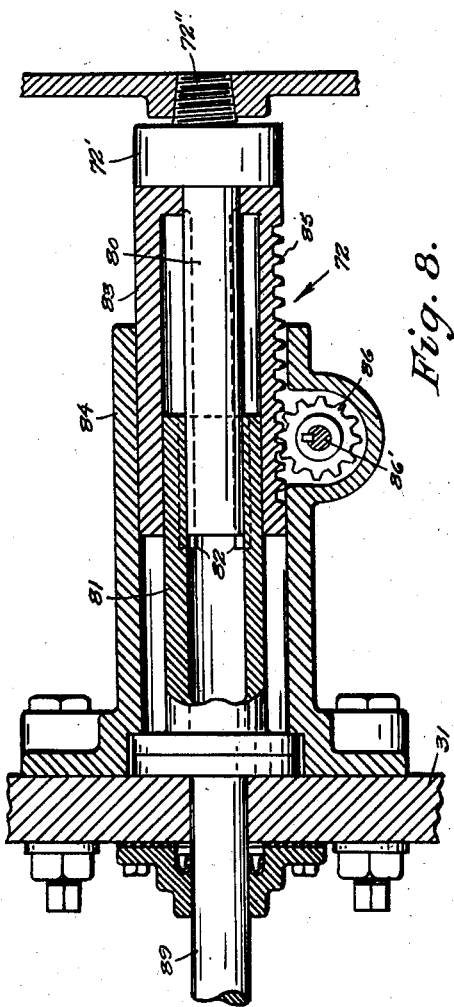
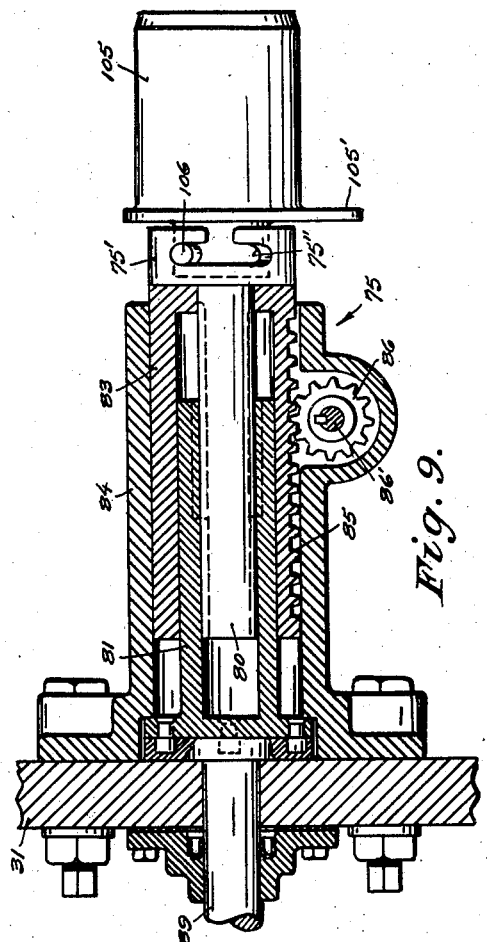

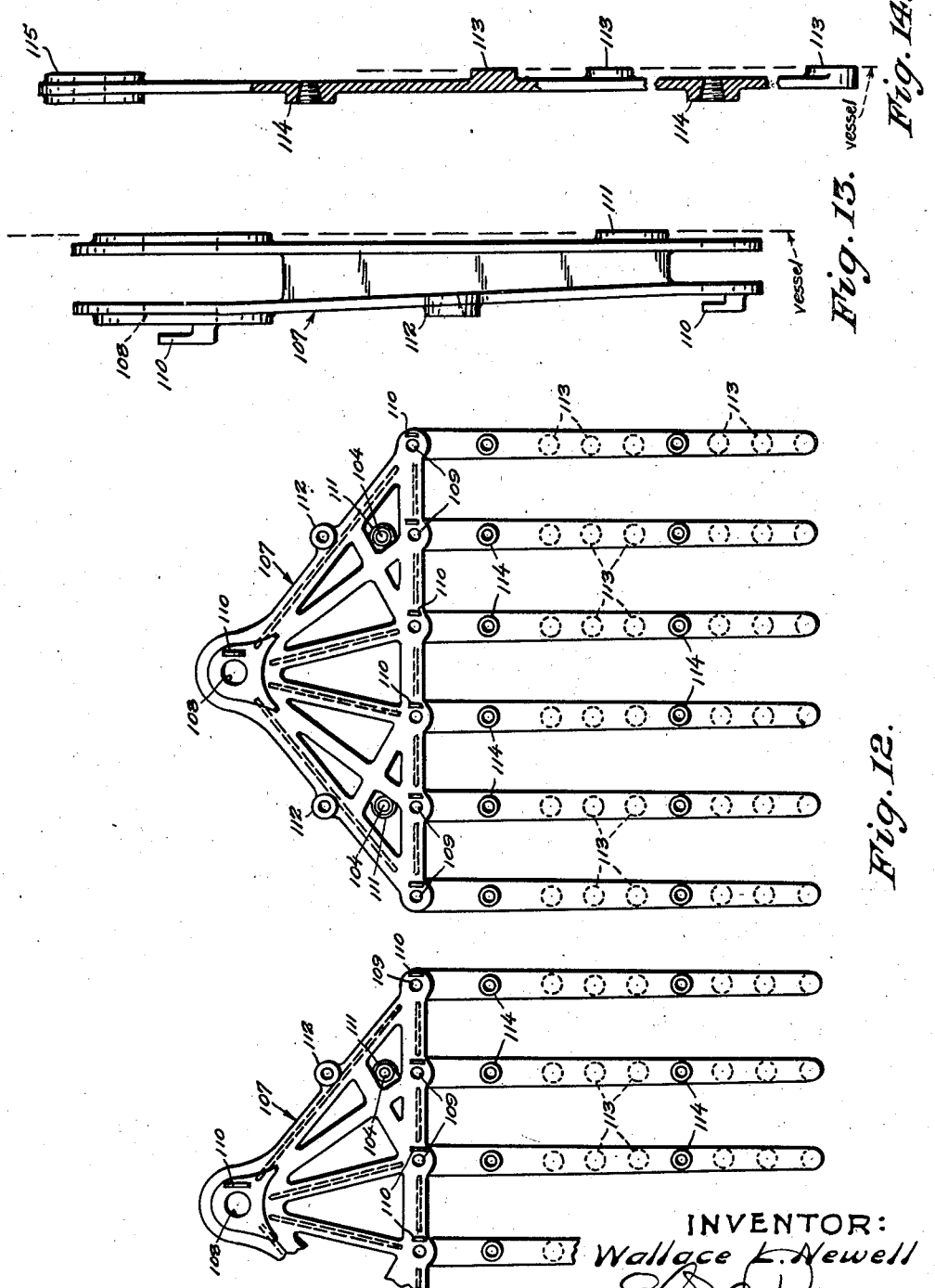

Dec. 10, 1946. W. L. NEWELL 2,412,417
ART OF RAISING SUNKEN VESSELS
Filed April 5, 1943 10 Sheets-Sheet 8

INVENTOR:
Wallace L. Newell
BY
ATTORNEY.

Dec. 10, 1946.   W. L. NEWELL   2,412,417
ART OF RAISING SUNKEN VESSELS
Filed April 5, 1943   10 Sheets-Sheet 9

INVENTOR:
Wallace L. Newell
BY
ATTORNEY.

Dec. 10, 1946.   W. L. NEWELL   2,412,417
ART OF RAISING SUNKEN VESSELS
Filed April 5, 1943    10 Sheets-Sheet 10
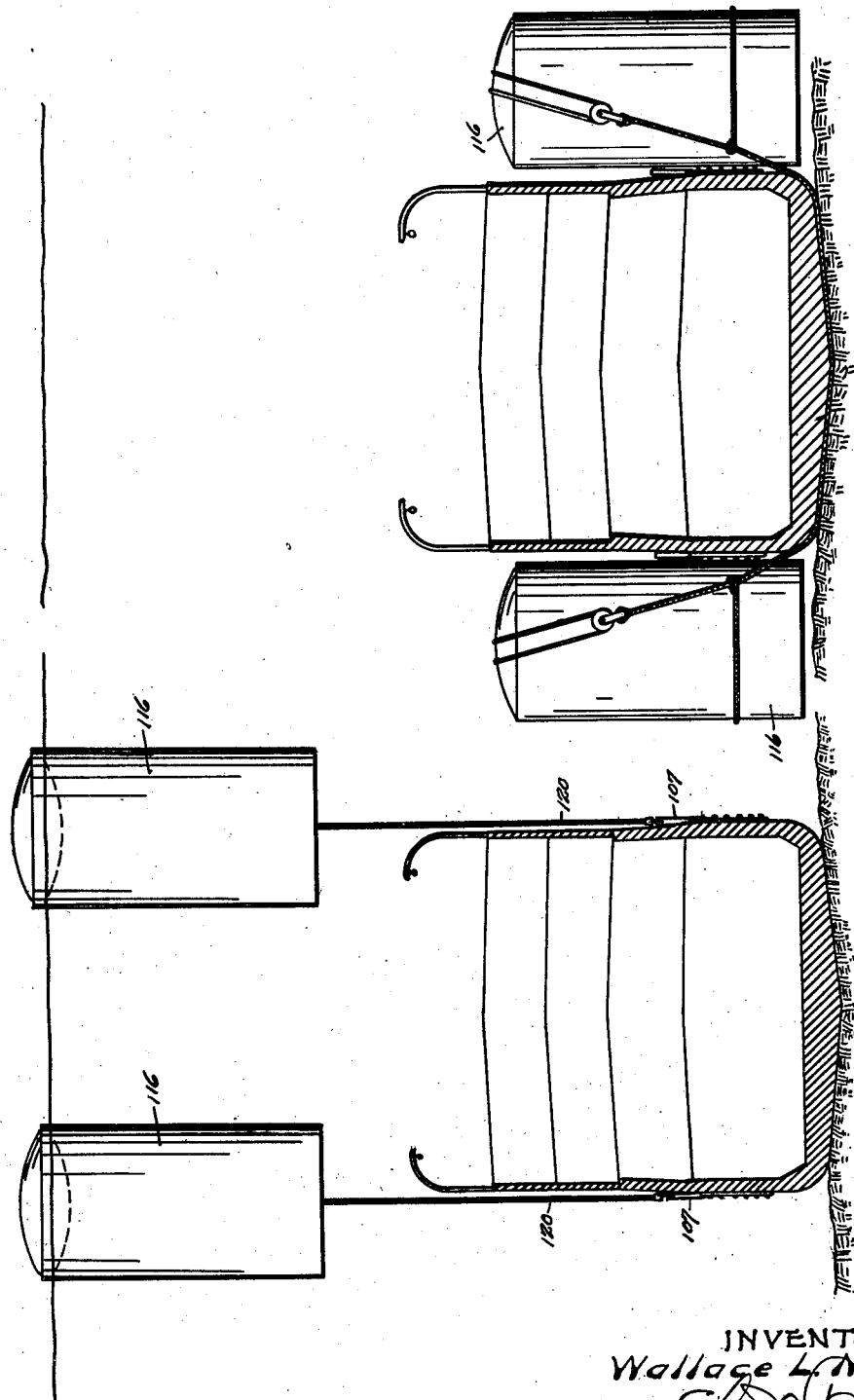
INVENTOR:
Wallace L. Newell
BY
ATTORNEY.

Patented Dec. 10, 1946

2,412,417

UNITED STATES PATENT OFFICE 2,412,417

ART OF RAISING SUNKEN VESSELS

Wallace L. Newell, Seattle, Wash.

Application April 5, 1943, Serial No. 481,938

19 Claims. (Cl. 114—51)

This invention relates to the art of salvaging sunken vessels by the attachment of elevating pontoons having a collective buoyancy characteristic exceeding the vessel's weight, and its general object is to provide advanced equipment permitting the attachment operations to be performed under conditions of water pressure which prohibit ordinary diving methods.

It is a further and important object to perfect the attachment devices proper.

Maximum clarity will perhaps be best obtained by here stating that my system of salvaging is made possible by the use of a caisson arranged to carry a working crew and which is so devised as to permit all of the underwater operations to be effectively carried on by external mechanism controlled from the interior of the caisson. In the course of performing its work the caisson is adapted to make repeated trips between the surface and the sunken vessel, and in so doing is arranged to operate much in the manner of an elevator, rising by its own buoyancy and descending against this buoyancy influence through the instrumentality of cables leading from the caisson to a severalty of anchoring blocks suitably placed upon the ocean floor, the descent being accomplished by winding the caisson-ends of the cables about power drums mounted along the sides of the caisson. The ultimate attachment is one in which two cables suspended from each of the lifting pontoons are respectively coupled to load-accummulating trunk-plates secured to the hull of the vessel at spaced intervals along the sides, and with each of these trunk-plates being coupled to a severalty of load-straps which are in turn fixedly bolted to the hull-plates of the vessel, the load-straps functioning to distribute the lift-stress from each said pontoon over a relatively wide area. More especially, the system of attachment is so engineered with perpendicularly disposed load-straps bolted to the hull at spaced intervals of the straps' lengths, the load-straps lying in relatively close proximity and spaced equidistantly throughout the substantial length of the vessel, as to obtain an even distribution of the lift-force and in consequence obviate spot-loading which, evidenced in most if not all prior salvaging attempts, not infrequently causes side plates to be torn from the hull of the vessel.

In carrying out my attachment procedure, the caisson in the course of successive trips between surface vessels and the working level is first caused to apply the trunk-plates to the sunken vessel, then carries the load-straps down to the hull and, after coupling the same to the trunk-plates, bolts the straps to the hull plates, and finally carries the lifting pontoons down and couples the cables thereof to the trunk-plates.

The invention resides in the new method of attaching the lifting pontoons to the hull, and further consists in the novel construction, adaptation and combination of parts comprising the attachment devices, and in the advanced construction, adaptation and combination of elements comprising the caisson.

The now preferred embodiment of the invention is illustrated in the accompanying drawings, wherein:

Figure 1 is an end elevational view of the caisson with dotted lines being employed to indicate the cables of a pontoon which, in the final descent of the caisson, are caused to be coupled to the load-accummulating trunk-plates of the attachment devices.

Figs. 6 and 7 are large-scale fragmentary elevational views with parts broken away and shown in section and indicating the application of said jacks in the performance, respectively, of a drilling and a tapping office.

Figure 5:
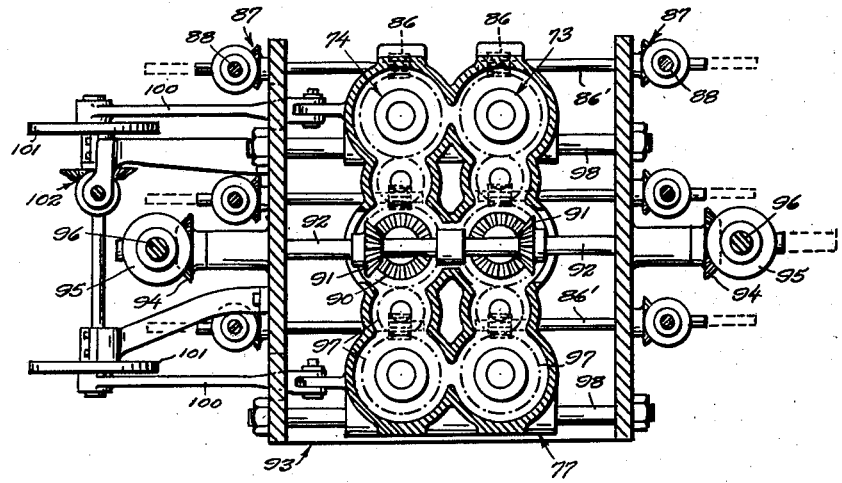
Fig. 5 is a vertical sectional view on line 5—5 of Fig. 4 illustrating one of several gangs of the drill-and-tap jacks which the caisson provides.

Figs. 8 and 9 are fragmentary vertical sectional views of other jacks provided upon the exterior of the caisson and which, in the one instance, support the trunk-plates and the load-straps as the same are carried to the sunken vessel in the related descents of the caisson, and in the other instance carry the pins which are employed to couple the load-straps to the trunk-plates. The scale used in these views is larger than that of Figs. 4 and 5 but reduced from the scale of Figs. 6 and 7, all of the jacks in the actual construction being more or less of uniform size. It may be pointed out that the jack of Fig. 8 occupies a relatively extended position while the jack of Fig. 9 is shown relatively retracted.

Fig. 10 is a side elevational view of a coupling pin detached and turned approximately 90° from the disclosure of Fig. 9.

Fig. 11 is an end elevation of the coupling pin, the dotted lines indicating the manner in which a radial arm formed upon the pin is caused to perform a latching office for preventing axial dislodgment of the pin from its coupling position.

Fig. 12 is an elevational assembly view to illustrate the hook-up between the trunk-plates and the load-distributing straps, it being understood, however, that in the actual attachment operation the straps are brought down two at a time, these two straps bolted to the side of the hull after being coupled to the trunk-plate, and then another two straps brought down and attached. The discrepancy lies in the fact that the view does not show any of the straps as having been bolted to the hull, and is intended simply to disclose the functional relationship as between paired trunk-plates acting in complement to take the lift-force from the two suspended cables of a single pontoon, and as between each said trunk-plate and a severalty of load-straps related thereto.

Fig. 13 is an enlarged side elevational view representing a trunk-plate in the position which the same would occupy against the hull of the vessel to be raised.

Fig. 14 is a similarly enlarged side elevational view, partly in vertical section, of one of the load-straps.

Figure 15:
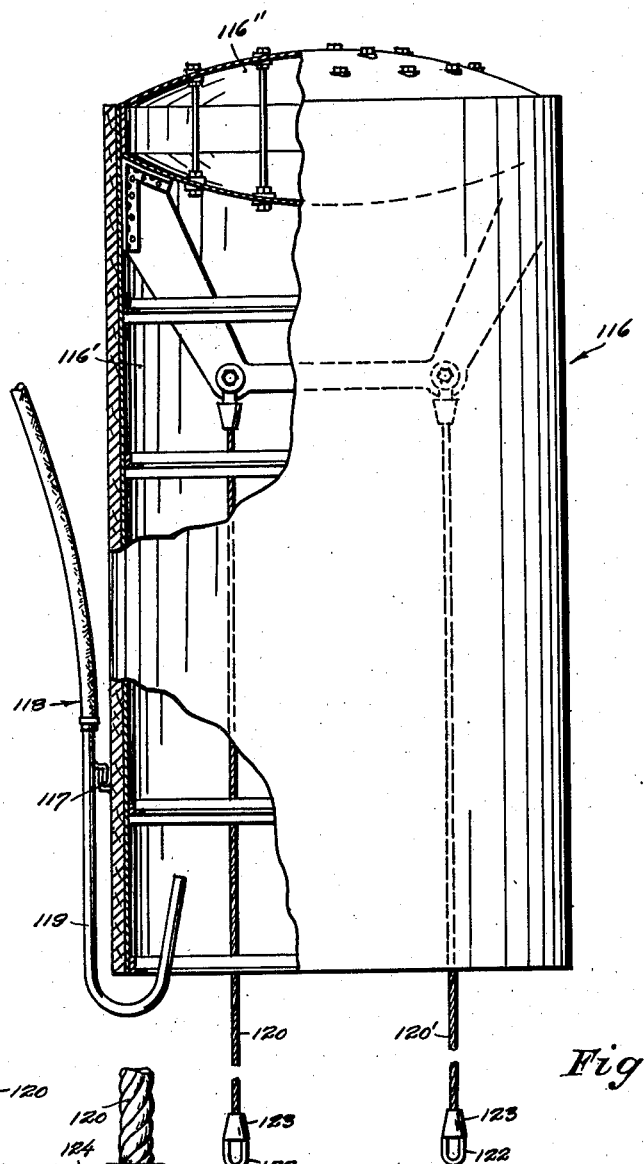

Fig. 15 is an elevational view, partly in vertical section, detailing a lifting pontoon.

Figures 16, 17:
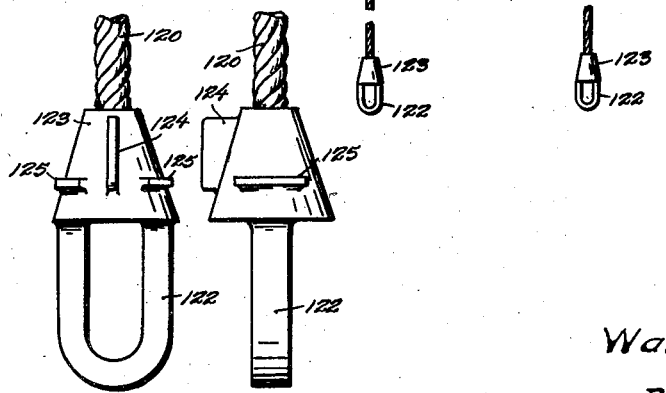

Figs. 16 and 17 are fragmentary front and side elevational views, respectively, taken to an enlarged scale from that of Fig. 15 and detailing the stirrups which are cable-suspended from the pontoons and find engagement in apical sockets formed in the trunk-plates, pins similar to but larger than those illustrated in Figs. 9 through 11 being employed to couple the stirrups to the plates.

Figure 18:
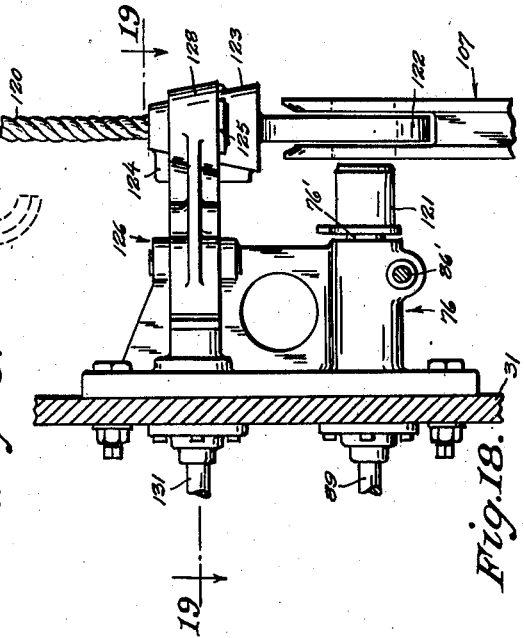

Fig. 18 (appearing on Plate 2) is a fragmentary side elevational view detailing the caisson-carried external rigging which serves to engage the stirrup for drawing the pontoons downwardly and which, by an interrelated jack arranged to carry a coupling pin, permits a facilitated coupling of the stirrup to the related trunk-plate.

Figure 19:
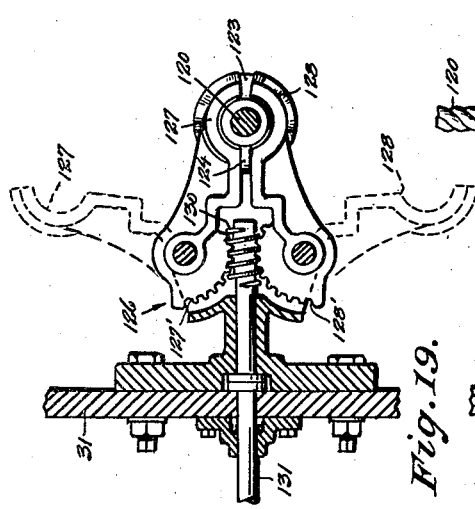

Fig. 19 is a horizontal section on line 19—19 of Fig. 18 and indicating, by full and dotted lines, the operative and inoperative positions of the clamping arms which act to engage the stirrup.

Figure 20:
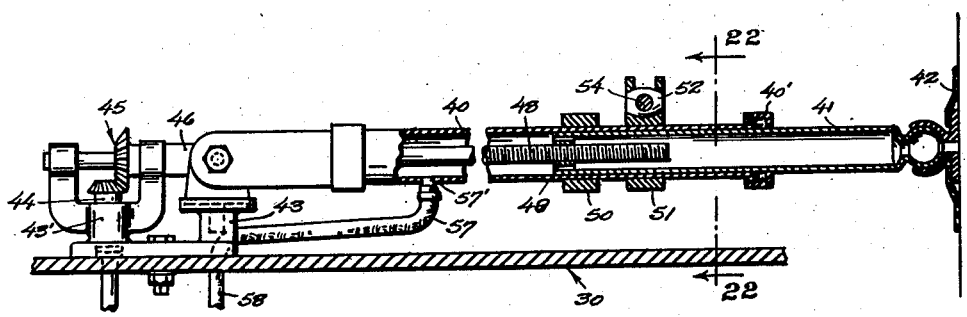

Fig. 20 is a top plan view with parts in horizontal section detailing one of a severalty of suction devices which I employ as a means of permitting the caisson to attach itself to the vessel's hull for carrying out the various attachment operations for the lifting pontoons.

Figure 21:
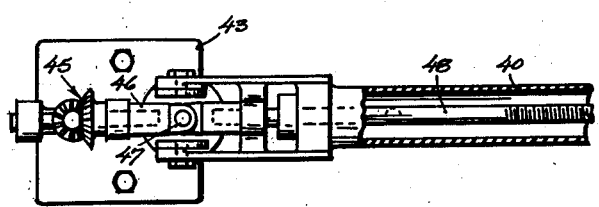

Fig. 21 is a fragmentary side elevational view with parts in section further detailing the suction devices.

Figure 22:
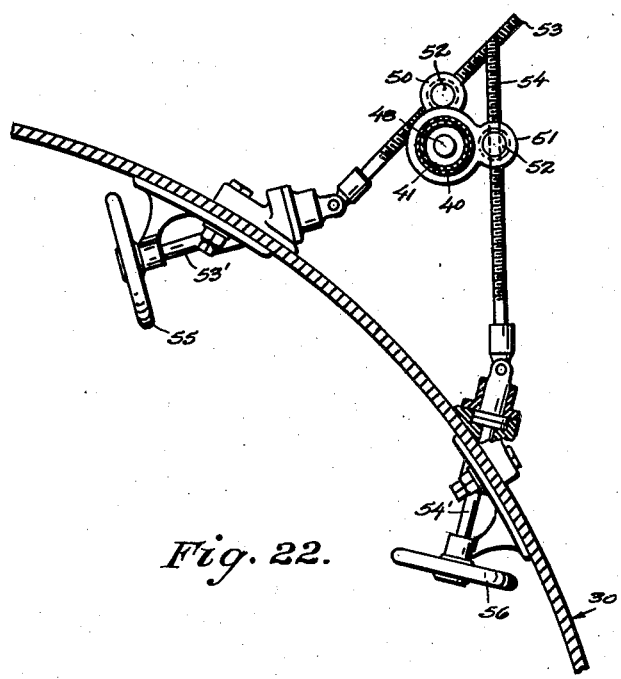

Fig. 22 is a fragmentary transverse vertical section on line 22—22 of Fig. 20.

Fig. 23 (appearing on Plate 5) is a detail sectional view to an enlarged scale illustrating the safety connection which permits the stationary parts of the caisson's external gear to be stripped from the caisson in the event that any such part should, for one reason or another, hang up by reason of becoming fouled in the course of a salvage operation; and Fig. 24 is a detail sectional view to a like scale illustrating a safety coupling which, similarly for jettison purposes, permits driven parts to be discarded coincident with the stripping of the stationary support which carries the same.

Fig. 25 is a somewhat schematic transverse vertical sectional view which indicates the manner in which the load-straps, the trunk-plates, and the stirrups act in complement to transmit the lift-force of the pontoons to the sunken vessel, and represents the vessel as having been brought upwardly from its deep-water position and then moved into relatively shallow water; and Fig. 26 is a similarly schematic view indicating a final procedure which I desirably follow as a means of bringing the vessel to the surface from its said shallow resting.

With reference being had to said drawings, and first describing the caisson which I generally indicate by the numeral 30, the same is desirably of a cylindrical form closed at the ends by front and rear heads 31—32 and structurally reinforced to withstand the pressures of relatively extreme depths, with a man-hole 33 being provided for the entrance of the working crew. The front head is somewhat recessed in order that the cylindrical wall may project forwardly as a protective hood for operating rigging which I will later describe.

Mounted exteriorly along the caisson's sides on the approximate horizontal center line are a plurality of wire-rope drums—three in number for each side—operated by worm drives from shafts 37 which are journaled through the wall of the caisson and are powered from within by electric motors (not shown). From the two end drums 34—34' at each side of the caisson the wire-ropes 35 pass over fairlead plates 36—36' and thence to related anchoring blocks 38—38' which have been placed upon the ocean floor to occupy positions in the approximate perpendicular plane of the drums, and from the center drums 39 the wire-ropes 35' lead outwardly to anchoring blocks (not shown) which have been placed at some distance laterally from the first said anchors. It will thus be seen that by controlling the winding action of the various drums the caisson may be drawn down to its working position along the side of the sunken vessel, being controlled laterally through the instrumentality of the center drums. Upon rising to the surface after having applied a fitting to the hull, the caisson is caused to occupy the position illustrated in Fig. 2 by holding the after drums while continuing to pay out the wire-ropes from the forward drums 34, thereby exposing the front head 31 and enabling a surface tender to affix the tools or fittings required in a following work-operation. When so affixed, the caisson is again brought to a horizontal position and drawn down to the side of the hull.

For use in attaching the caisson to the hull in the caisson's successive trips to the working level, there are provided suction devices which, desirably, are disposed at the sides to lie above and below the horizontal center line. I have deleted these devices from the showing of Fig. 2 for purposes of simplifying the illustration but indicate the same in Fig. 1 and detail the construction in Figs. 20 through 22, inclusive. From an inspection of these latter views, it will be seen that the devices—operating as suckers—are comprised of two telescoping tubes 40 and 41 of which the latter, as the extensible member, is fitted on its outer end with a suction cup 42, and of which the other member is connected for compound swinging movement to a stationary support 43 fixed to the side wall of the caisson. Also provided by the support 43 is a mounting 43′ which acts as a journal for a rotary shaft 44 which, like the shafts 37, is powered from the interior of the caisson by an electric motor (not shown). Acting to control the telescopic movement of the tubes, the shaft operates through bevel gearing 45 to drive a stub shaft 46, and articulating through a universal joint 47 with this stub shaft is a rod 48 which extends axially of the tube through a suitable packing gland to find thread engagement with a travelling nut 49 fixed to the extensible tube 41. The slide fit between the tubes includes a water-tight cap 40′. In controlling the swinging movement of the tube-assembly within given angular limits, the tube 41 carries a pair of collars 50—51 presenting radial extensions, and received in these extensions are wrist-pins 52 traversed by threaded rods 53—54, the rods having universal connection at the root ends with shafts 53′—54′ arranged to be operated from the interior of the caisson by control wheels 55—56. To furnish the required suction to the cups of each said device, a flexible hose 57 is attached by a nipple 57′ to the tube 40 and, by any suitable coupling, carries into the interior of the caisson for connection with a related suction pipe 58, 59, 60 or 61, as the case may be. These suction pipes, fitted with valves and indicated in Fig. 3, connect by a manifold 62′ with a suction pump 62 which has an external discharge.

Further characterizing my caisson is a ballast tank or tanks 63. Schematically shown in Fig. 3, there is provided for this ballast tank a three-stage pump 64 and functional thereto is a valve chest 65 having connection by a main 66 with the tank and also connecting through pipes 67 and 68 with manifolds 69—70 which in turn connect with a multiplicity of valved branches 71. These branches, terminating in external nozzles 71′ disposed along the sides and ends of the caisson, permit the caisson to be propelled in a desired direction horizontally by the act of taking water from one side or end and expelling the same as pressure jets from the opposite side or end. In more particularity, the valve arrangement for the pump allows of the water being forced directly from one manifold into the other manifold, or to or from the ballast tank, and it is through the instrumentality of the latter operation that the buoyancy of the caisson is controlled. It should be here stated that the caisson with the ballast tank emptied has a buoyancy characteristic exceeding the weights of the caisson and the anchoring blocks combined, in consequence permitting the caisson to shift the positions of the anchoring blocks at will as the successive working operations necessitate movement of the caisson progressively from one to the other end of the vessel.

While I have not illustrated the same in the drawings the caisson is provided with the usual hose connections to the surface tender and through which air at atmospheric pressure is supplied, as well as the necessary electric current to operate the various appliances and which additionally provides telephone communication. The caisson itself is also equipped with submarine lamps for illuminating the work, and provides inspection windows. Other non-illustrated features such, for example, as a cutting torch for removing obstructions are necessarily used but, being common practice and well-known, their inclusion in the drawings would unnecessarily complicate the disclosure.

Now proceeding to describe the various structural pieces which constitute my attachment means, and in the course of such description having reference also to the caisson-carried rigging by which such pieces are applied, it may be said that the system of attachment essentially resides in picking up the weight of the vessel by transmitting the lift-force from each pontoon through paired cables to two trunk-plates and then distributing the force from each said trunk-plate through a gang of, say, six flexible metal straps yoked together by the trunk-plate. The straps lie in parallelism and occupy perpendicular planes. While the trunk-plates and straps might feasibly be formed integral, the preferred arrangement utilizes pins to couple the upper extremity of each strap to its related yoke, the yoke or trunk being in the form of a truss and presenting an apical opening receiving a larger pin which in turn couples the trunk-plate to one of the two cables suspended from the lifting pontoon.

Figure 2:
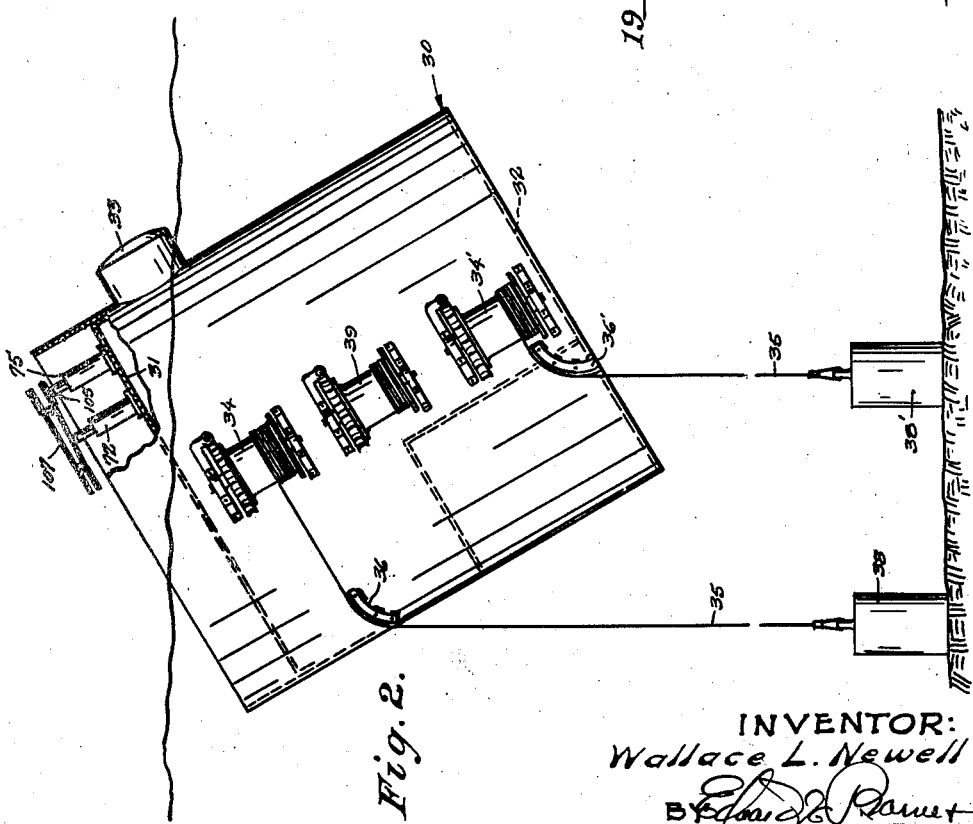
Fig. 2 is a reduced-scale side elevational view of the caisson, with parts in section, and showing the same at the surface preparatory to a descent and after having been fitted with one of the trunk-plates.
Figure 3:
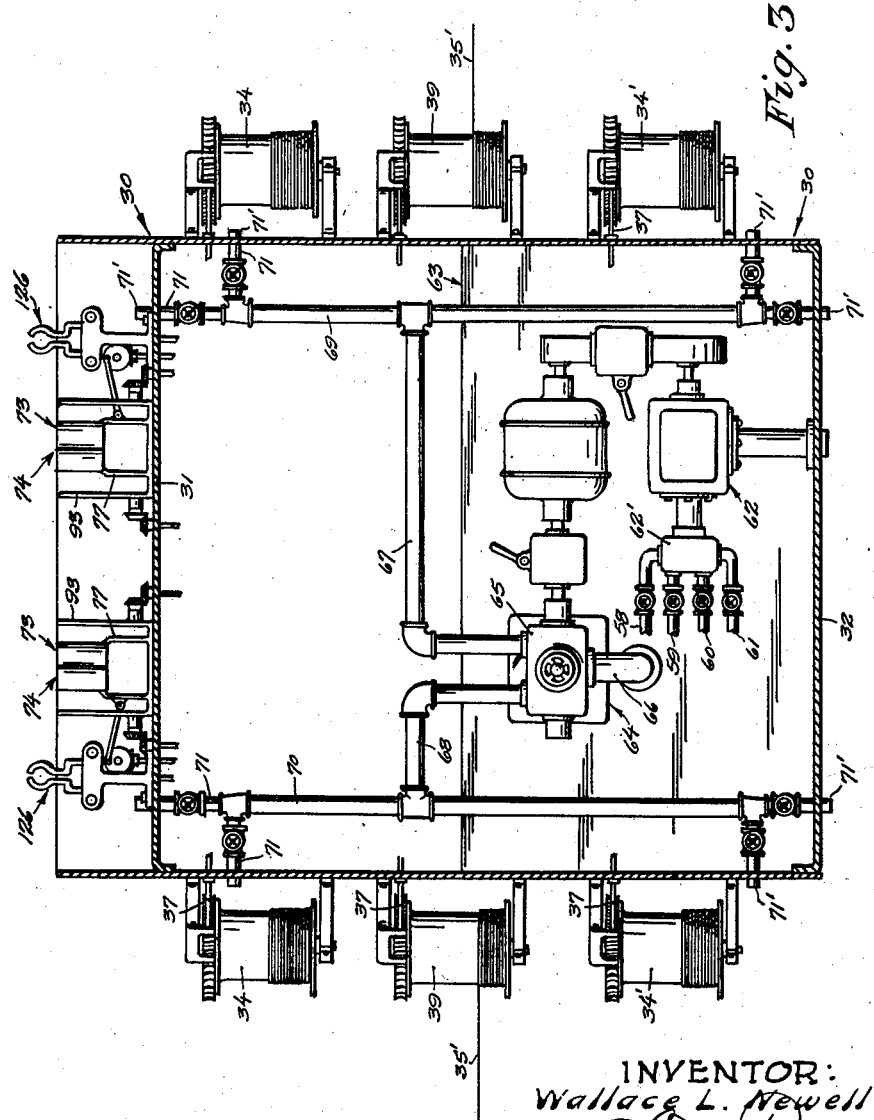
Fig. 3 is a horizontal sectional view of the caisson, the view being somewhat schematic in that the interior controls for the external operating mechanism are shown fragmentarily. The view is intended primarily to portray the pumping arrangement for governing the buoyancy of the caisson and which permits the caisson to be propelled horizontally in various directions.

In performing the work of anchoring the straps to the hull plates of the vessel, and which procedure is also followed in first attaching the trunk-plates to the vessel, the method is to affix the part in question upon the front head 31 of the caisson while the latter occupies the position shown in Fig. 2 and, after descending and setting the caisson in its required working position by means of the sucker cups, pressing the attachment piece against the side of the vessel and performing the successive steps of drilling through the piece and the hull plate, backing off the drill, and then inserting a tap-bolt. After screwing the tap-bolt home, the shank is twisted off, the caisson disengaged from the now-attached piece, and the caisson rises to the surface for receiving the next attachment piece. The rigging of the caisson which permits these operations is comprised of a number of jack devices which occupy positions upon the front head 31, perforce being located in accordance with a definite predetermined pattern corresponding to the particular form of the attachment pieces. Giving name and numerical identity to the jacks which perform these steps, I will refer to the same as mounting jacks 72, drill jacks 73, and tap-bolt jacks 74. Of these jacks, the latter two must necessarily perform their respective drilling and tapping offices on the same axis in order that the tap-bolt may register with the drilled hole, and as an accommodation thereto I support sets of these jacks on a common slide carriage and by shifting the same transversely as the need arises enable the hole to be first drilled and the tap-bolt then inserted. Also provided upon the caisson's front head and occupying positions following a given pattern are jacks 75 and 76 for carrying the coupling pins, the former to handle the smaller pins which connect the straps to the trunk-plates and the latter to handle the larger pins which secure the trunk-plates to the pontoon cables.

The system insofar as it pertains to the attachment of the trunk-plates, and the attachment of the load-straps, is one in which the trunk-plate is first brought down and secured in position upon the vessel, and the load-straps then brought down and pin-coupled to the trunk coincident with the operation of bolting, it being pointed out (see Fig. 12) that the caisson, as I have designed the same, is arranged to handle the straps of each gang in sets of two, applying the Nos. 1 and 4 straps first, followed by 2 and 5, and finally 3 and 6. Considered in more particularity, this is to say that my jacks 72—73—74—75 are placed in two vertical lines transversely spaced in correspondence with the spacing between the 1 and 4, 2 and 5, and 3 and 6 straps of related gangs and are, moreover, given a location in each such line correlating the respective jacks to the various attachment pieces. This arrangement, see Fig. 1, locates a pin-jack 75 at the upper end of each such line, and places paired sets of drill and tap-bolt jacks 73—74 therebelow which, preferably, are applied in groups of, say, three pairs of jacks to a group. Each such group is shiftable laterally as a unit upon a common slide-carriage 77, and I have indicated two of the carriage-mounted groups as being provided for each line, spaced one from the other and from the pin-jack 75 such as to admit of the placing of a mounting jack 72 in each space interval. This is to say that there are two mounting jacks in each of the vertical lines, the upper mounting jack lying between the pin-jack and the upper group and the lower mounting jack lying between the two groups of drill and tap-bolt jacks.

Figure 4:
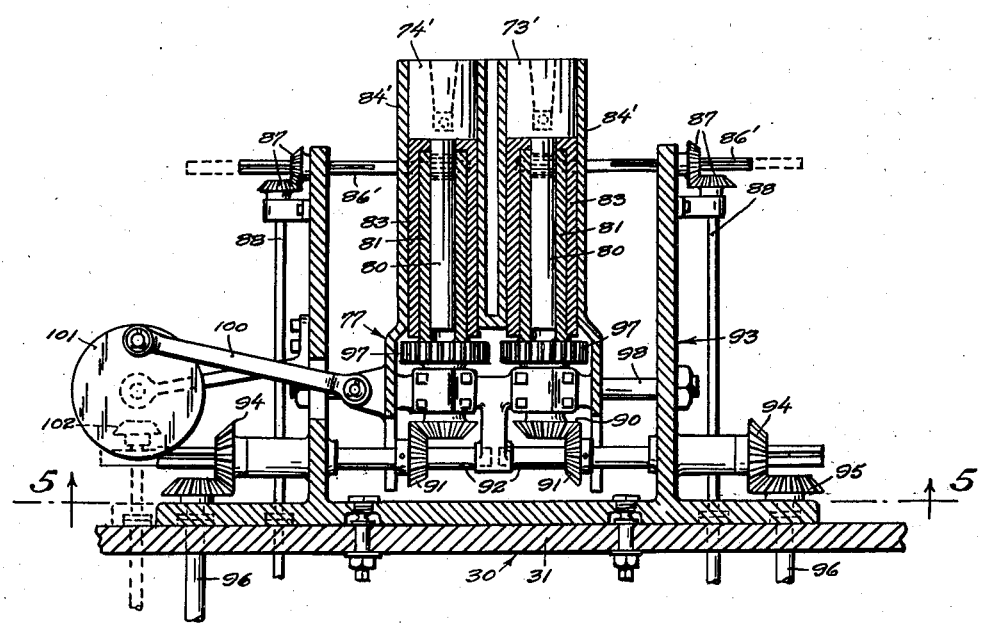
Fig. 4 is a fragmentary horizontal section taken to an enlarged scale on line 4—4 of Fig. 1 to detail one of several jack assemblies provided as exterior rigging upon the caisson, the disclosed jacks acting to carry drills and tap-bolts and being indicated in fully-retracted positions.

Having reference to Figs. 4, 5, 6 and 7 (detailing the drill and tap-bolt jacks), Fig. 8 (detailing the mounting jacks), Fig. 9 (detailing the pin-jacks 75), and Fig. 13 (detailing the jacks 76 for the larger pins and which, by a further inspection of Fig. 1, will be seen to lie in offset relation from said vertical lines), it may be said that all of the jacks are more or less functionally alike in that each provides a working head—as 72', 73', 74', 75' and 76'—carried as an integral part of a mandrel 80 which is characterized by both rotary and axial movement. The mandrel is given a sliding fit in a hollow drive spindle 81 and is driven from the latter by a key 82 (Fig. 8), and is also thrust-coupled to and finds a rotary journal in a non-rotary piston 83 received in a body cylinder which, for the mounting and pin jacks, is rigid with the caisson head and is denoted by 84 and, for the drill and tap-bolt jacks, is formed as a part of the shiftable carriage 77 and is denoted by 84'. Each said piston has a rack 85 cut along one side thereof, and meshing the teeth of the rack to govern the axial movement of the mandrel is a spur pinion 86. The spur pinion is controlled in the manner illustrated in Fig. 4, which is to say by a horizontal shaft 86' connecting through bevel gearing 87 with a shaft 88, the latter extending through the front head of the caisson and being manually operated from within the caisson by a control wheel (not shown). For driving the spindles of the stationary jacks 72, 75 and 76, the same are coupled to a co-axial power shaft 89 which extends for manual operation into the caisson, and for driving the spindles of the shiftable drill and tap-bolt jacks I provide a system as illustrated in Fig. 4 wherein a bevel gear 90 is fixedly carried upon the inner ends of the center-jack spindles and meshes a bevel gear 91 which is pin-connected to a travelling shaft 92 journaled for rotary and axial movement in a stationary frame-work 93, there being two such travelling shafts one for the center drill-jack of each group and the other for the center tap-bolt jack of the group and each having a bevel gear 94 slidably keyed upon its outer end to mesh a bevel gear 95 driven from a shaft 96 which is in turn driven from within the caisson by electric motors (not shown). Transmitting the drive from the center jacks of said drill and tap-bolt groups are intermeshing trains of spur gears 97. The slide mounting for my shiftable carriages 77 is indicated as comprising rigid spanner bars 98, and for performing the shifting function I connect the carriages by means of pitmans 100 with cranks 101 and operate the latter through bevel gearing 102 from within the caisson.

In Figs. 6 and 7 I have shown enlarged views of the heads 73' and 74' with the related tools 103 and 104 applied thereto, and illustrate the same in the performance of their respective office, the one a drilling function and the other a combined tapping and bolting function. The structural form of said drill and tap-bolt fittings is apparent from an inspection of these views, noting that the shanks of my tap-bolts are formed with a weakened part, as 104', permitting the same to be readily twisted off after the bolt has been screwed home. The heads 72' and 75' are similarly detailed in Figs. 8 and 9, respectively, the former presenting a quick-release stud-screw 72'' and the latter being formed with a bayonet-joint 75''. The pin which is handled by the pin-jack 75 is designated by 105 and is shown applied in Fig. 9, being formed with a bayonet dowel 106 and additionally providing a lateral latching arm 105' the function of which will appear in the course of describing the trunk-plate.

Having the nature and location of the various described jacks in mind and additionally pointing out that the jacks 76 and the pins therefor are, excepting as to the size of the pin, similar to the jacks 75 and the pins 105, and now directing particular attention to Fig. 12 and the related Figs. 13 and 14, it will be seen that my trunk-plates 107 generally follow the plan configuration of a king-post truss and are of a channeled form providing a socket at the top for the reception of a lifting cable, and a series of sockets along the bottom for connection with the load-straps. Such channel walls are transversely pierced to provide pin-receiving eyes 108 and 109, and upon the frontal face of the plate, laterally offset from each eye, is an upstanding finger 110 describing a locking slot for the latching arms 105' of the pins. Characterizing the trunk-plates, there is provided an imperforate lug 111 lying above and in the substantial perpendicular planes of the second and fifth eyes 109, and also formed upon the plates to lie above the lugs are lateral ears 112 which are bored and threaded to operate as females for the quick-release stud-screws 72'', the ears and lugs—considered both as to lateral and vertical spacing—being in exact correspondence with the upper pair of mounting jacks and the top-most pairs of drill and tap-bolt jacks. The procedure of securing the trunk-plates to the sunken vessel can be described as follows: the piece to be applied is first attached to the caisson as indicated in Fig. 2 by inserting the upper two stud-screws 72'' into the threaded ears, the caisson, while occupying this position, also having drill and tap-bolt fittings introduced to the top-most pairs of jacks 73—74. The caisson now descends, is attached to the hull of the vessel in a position to properly locate the trunk-plate, and the jacks 72 are extended to press the trunk piece against the hull plates, following which the two upper carriages 77 are shifted to bring the drills 103 into registration with the approximate centers of the lugs 111, and the drilling operation is performed to cause the drills to pass through the lugs and the underlying hull plates, it being noted (Fig. 6) that the drill has two diameters functioning to cut a larger bore in the lugs than in the hull plates. The drills are then backed off, and the carriages shifted in the opposite direction to bring the tap-bolts into registration, whereupon the tap-bolt jacks 74 are operated to feed the tap-bolts freely through the larger bore of the lugs and cut threads in the smaller aligned bore of the hull plates. Having cut their own threads, the tap-bolts are screwed home to bring the lugs of the trunk-plate firmly against the vessel's side and, by continuing to turn the jacks, the shanks are twisted off. The stud-screws are now unscrewed from the trunk-plate, the sucker cups freed from the vessel, and the caisson rises to the surface to receive the related load-straps.

These load-straps are formed to present a plurality of imperforate boss projections 113 disposed upon the rear face and spaced vertically from one another in correspondence with the spacing between the several sets of carriage-mounted jacks 73—74, and upon the front face present two bosses 114 which are bored and threaded to operate as females for the stud-screws of the mounting jacks and consequently are placed to exactly register with the upper and lower said jacks. Also provided by each strap at the upper extremity thereof and so spaced above the upper boss 114 as to exactly register with the pin jack 75 when the strap is applied upon the caisson is an end-lug 115. The procedure of securing the straps to the related trunk-plate and to the vessel, and reiterating that these straps are applied in sets of two, is as follows: the two straps, 1 and 4, 2 and 5, or 3 and 6, as the case may be, are attached to the caisson while the latter occupies its above-water position through the instrumentality of screwing the four stud-screws 72″ into the related bosses 114, the drill and tap-bolt fittings being at the same time introduced to the various carriage-mounted jacks 73—74, and pins 105 being inserted in the bayonet-sockets of the two jacks 75, these latter jacks being fully retracted and in which position a space is left between the outer ends of the pins and the registering end-lugs sufficient to accommodate the later under-water introduction of the end-lugs into the related bottom sockets of the trunk-plate. The caisson is caused to descend and is attached by the suckers to the side of the vessel in the approximate location desired—a position disposing the end-lugs slightly below the trunk-plate—and the caisson is then accurately located by means of the angularly-disposed control arms 53—54 of the suction devices to bring the end-lugs upwardly into the trunk sockets, the jacks 75 being now operated to pass the pins 105 through the registering eyes of the trunk-plate and the end-lugs, whereupon the pins are given a right-hand quarter-turn to latch the same and the jacks 75 are then reversely turned to align the dowels with the feed-throat of the bayonet slots and are backed off from the pins. The successive drilling and bolting steps, the twisting off of the bolt shanks, and disengagement of the stud-screws from the straps are thereupon performed in substantially the same manner as has been described in connection with the attachment of the trunk-plates, the operation being one in which all of the drill jacks and then the tap-bolts jacks are caused to operate in unison or, where the curve of the vessel's side precludes such, first the upper group and then the lower group, shifting the caisson somewhat before using the second group of jacks to tilt the caisson's axis after having disengaged the upper two stud-screws. The purpose of such shifting is thought to be clear, namely to have the drilling axes lie relatively at right angles to the hull plate being drilled. The flexibility of the straps permits the same to conform readily to curved surfaces. It should perhaps be here stated that I have simplified the disclosure of the straps, and perforce the related drill and tap-bolt jacks, by showing the straps as being bolted at only six points whereas, in practice, the straps are bolted at a greater number of points by an additional group or groups of jacks 73—74 lying below those which have been illustrated.

Assuming that two adjacent gangs of load-straps and the trunk-plates therefor have been secured upon the side of the vessel, the same are ready to receive one of the pontoons which, with the handling gear therefor, are detailed in Figs. 15 through 19. The pontoon is designated generally by 116 and provides two chambers 116′ and 116″ of which the former is open at the bottom to the sea and of which the latter, containing a sealed volume of air, lies at the head end of the pontoon and has a buoyancy characteristic somewhat exceeding the weight of the pontoon to maintain the pontoon in an upright position. Upon the side of the pontoon is a hook 117 adapted to releasably engage an air hose 118 which terminates in a gooseneck 119. The air hoses with their gooseneck nozzles are adapted to be brought down by the caisson and attached to the pontoons—for expelling water from the lower chambers—after all of the pontoons have been coupled to the vessel, and the goosenecks, while not illustrated, are therefor provided with external fittings accommodating the stud-screws 72″ of the mounting jacks.

Depending from the pontoons and spaced apart in correspondence with the approximate spacing between the two apical eyes of an adjacent pair of vessel-attached trunk-plates are cables 120—120′, and provided at the lower extremities of these cables are coupling members formed to present a basal stirrup 122 surmounted by a conical head 123, the head operating as a haul-down collar and the stirrup describing a clevis which is arranged to be held in the apical socket of the trunk-plate by means of the larger of my above referred-to locking pins and which I designate by 121. There is provided upon such haul-down head a vertical fin 124 disposed centrally as regards the bow of the stirrup, and a pair of shoulders 125 at each side thereof. Corelated to this stirrup fitting and positioned as to lateral spacing in correspondence with the spacing between the two cables of a pontoon, the front head 31 of the caisson provides handling devices which contain the pin-jacks 76 and additionally embody haul-down clamps 126 for the haul-down collars, the haul-down clamps being comprised of pivoted jaws 127—128 formed to close against the fin 124 and find a snug fit about the collar in seating engagement against the shoulders 125, being operated by toothed segments 127′—128′ in mesh with a worm 130 which is manually controlled by a shaft 131 from the interior of the caisson. The procedure of securing the pontoon cables to the attached trunk-plates is clearly indicated in Fig. 18, the caisson, after having had the jaws 127—128 closed upon the collars 123 while in its above-water position, and the locking pins 121 introduced to the bayonet sockets of the jacks 76, being brought down along the side of the vessel and positioned to insert the stirrups in the apical sockets of the adjacent trunk-plates, the pins being then inserted through the registering eyes, and the pins latched, and the jacks disengaged and backed off in the same manner as described for the smaller pins 105, whereupon the clamping jaws 127—128 are opened, the caisson-holding suckers freed from the side of the vessel, and the caisson elevated to the surface. It is to be expected that the apical eyes of two adjacent related trunk-plates may not lie in exact correspondence with the spacing which obtains between the jacks 76, but it becomes a simple matter to insert first one and then the other of the two pins 121, shifting the caisson laterally as required.

In further describing the various pieces of external rigging which I apply to the caisson, it is highly desirable that all mechanism on the outside of the same be so fastened as to permit such mechanism to be discarded at will in the event of any piece of rigging becoming fouled. In Figs. 23 and 24 I have detailed safety connections functioning to this end, the former view illustrating a connection for the stationary parts, and the latter a connection for the movable parts or, more properly, for the shafting which powers the same from the interior of the caisson. The illustrated safety connection for such stationary parts is comprised of a threaded bolt 133 extending through the wall of the caisson and having an integral flange 134 which, with an underlying compression washer, is caused to bear against the outside face of the wall by an interiorly applied nut 135, the bolt being formed with a squared head 136. Carrying outwardly beyond the flange, the bolt presents a reduced shank 137 terminating in a threaded part 138 arranged to project through a foot 140 of the rigging to be secured. A nut 141 engages the part 138 and, after being tightened down against the foot 140, is tackwelded to the foot and in consequence locks the outer length of the bolt against rotary movement to permit the shank to be twisted off by applying a wrench over the squared head 136. Where motion is to be transmitted through a shaft powered from the interior of the caisson, the safety coupling of Fig. 24 is employed, comprised simply of two abutting flanges 142—143, the one being integral with the power shaft and having a series of sockets 144 spaced at intervals about the circumference and the other having coupling pins arranged to seat in the sockets. A U-cup leather is applied about the power shaft to trap the slight leakage occurring.

Fig. 25 illustrates the system applied to raise a sunken vessel. Given, say, pontoons having an overall height of 40 ft., and considering that the vessel may have a considerable superstructure, the distance from keel to the upper limit of the pontoons would still normally not exceed 100 ft. This is sufficiently shallow, relatively speaking, as to permit ordinary diving and I have therefor accomplished a satisfactory end when my salvaging system permits a vessel, lying in deep water, to be raised, moved landwards, and set down on a bottom of 100 ft. depth or less. However, as a suggested second lift, the arrangement of Fig. 26 may be employed, in which case the vessel is brought in and over cables which have been laid in parallelism along the shallow bottom, the pontoons being then lowered to lie along the sides and the ends of the laid cables connected to chains or other like tackle carried over the tops of the pontoons. The vessel, by expelling water from the pontoons, is raised to the surface and may be beached at high tide or might be run into a dry-dock. In the operation of Fig. 26, the procedure would be carried on by divers who could easily and quickly perform the work.

The invention is thought to be clear from the foregoing. While I have described the various features substantially as the same are illustrated, it is not my intention to thereby imply that I am restricting myself thereto. The intention is that the invention is to be limited as to scope only as I expressly recite the same in the hereto annexed claims.

What I claim, is:

1. In a salvage operation employing a lifting hook-up including a member adapted to be secured upon the side of a sunken vessel, and given a submersible working caisson externally rigged upon its frontal face with operating tools, the method of performing the work which consists in surfacing the caisson and upending the surfaced caisson to expose said frontal face thereof and, while so exposed, detachably anchoring the lifting member upon said frontal face of the caisson to immovably hold the member in predetermined functional relation to the operating tools, submerging the caisson to the level of the sunken vessel and positioning the same to locate the lifting member upon the hull-plates of the vessel, operating the tools to secure the lifting member to the hull-plates, and detaching the caisson from the anchored lifting member.

2. In salvage equipment, the combination of a submersible working caisson externally fitted with devices for releasably attaching the caisson to the side of a sunken vessel; and external rigging upon the caisson operable from within the latter and acting to releasably secure a lifting strap to the caisson and, upon the attachment of the caisson to the vessel in a position functionally locating the strap, drilling holes through the strap and introducing bolts through these drilled holes to secure the strap to the hull-plates of the vessel, the said external rigging which functions to detachably secure the lifting strap to the caisson comprising bolts having a revoluble mounting in respect of the caisson and arranged and adapted to fit threaded sockets therefor provided in the lifting strap.

3. As salvage equipment for use in raising a sunken vessel: the combination of a lifting piece studded with a set pattern of bosses adapted to receive bolts therethrough for securing the piece to the hull-plates of the vessel; a submersible working caisson externally rigged with a plurality of bolt-applying jacks mounted for rotary and axial movement and disposed in a pattern exactly corresponding to the pattern of the bosses; and means for controlling the rotary and axial movement of said jacks from within the caisson.

4. As salvage equipment for use in raising a sunken vessel: the combination of a lifting piece studded with a set pattern of bosses adapted to receive bolts therethrough for securing the piece to the hull-plates of the vessel, and additionally providing threaded sockets; a submersible working caisson externally rigged with the male counterpart of said sockets and which are mounted for rotary and axial movement and correlated as to position with the sockets of the lifting piece for detachably supporting the latter upon the caisson; complementing rigging also mounted for rotary and axial movement externally upon the caisson and disposed in a pattern registering with the bosses of the supported piece and arranged to receive tap-bolts; and mechanism operable from within the caisson to control the rotary and axial movement of said external rigging.

5. As salvage equipment for use in raising a sunken vessel: a lifting pontoon having a depending cable presenting a terminal fitting formed to provide a stirrup and a surmounting haul-down collar; a plate adapted to be bolted upon the side of the vessel and formed with an apical socket to receive the stirrup, said socket being described between spaced walls transversely pierced to accommodate the insertion of a pin for coupling the plate to the stirrup; a submersible working caisson; external rigging upon the caisson comprising a device for detachably engaging the haul-down collar, and a pin-carrying device positioned to obtain registration as between the pin and the eye of the stirrup upon engaging the haul-down collar in the first said device; and means controlled from within the caisson and arranged to be operated upon an introduction of said stirrup into the socket therefor for axially advancing the pin to couple the stirrup to the vessel-attached plate.

6. In salvage equipment: a lifting piece adapted to receive bolts therethrough for securing the piece upon the side of a sunken vessel; a submersible working caisson externally rigged with devices for detachably supporting the piece upon the caisson; and complementary rigging also mounted externally upon the caisson comprising two like series of tool-carrying devices each arranged, considered as to the individual devices, for both rotary and axial movements and acting in the instance of one said series to receive drills and in the instance of the other said series to receive tap-bolts; and mechanism controlled from the interior of the caisson for first bringing the drill-carrying devices into functioning relation to the supported lifting piece and drilling the latter, and then replacing the drill-carrying devices with the tap-bolt carrying devices and operating the latter to boltably secure the lifting piece to the vessel's hull.

7. In salvage equipment, and in combination with a lifting piece studded with a set pattern of imperforate bosses adapted to receive bolts therethrough for securing the piece upon the side of a sunken vessel, and which piece additionally provides threaded sockets offset from the bosses, and with tap-bolts functional to cut their own threads and having a weakened shank permitting the shank to be twisted off after screwing the bolts home: a submersible working caisson; male counterparts of the threaded sockets mounted for axial and rotary movements upon the outside of the caisson and correlated as to position with the position of the sockets for detachably supporting the lifting piece upon the caisson; operating mechanism controlled from within the caisson for governing the axial and rotary movements of said males; complementary devices also mounted for axial and rotary movements upon the outside of the caisson, disposed in a pattern exactly registering with the bosses upon an engagement of said males in the threaded sockets of the lifting piece, and arranged to carry the tap-bolts; and means operable from within the caisson for controlling the rotary and axial movements of said last-named devices.

8. In salvage equipment: a submersible working caisson externally rigged with a plurality of devices located at spaced intervals about the perimeter, having a universal mounting, and each terminally fitted with a suction cup to permit the caisson to be releasably attached to the side of a sunken vessel; and means operable from within the caisson and connecting with said devices for effecting controlled relative movement between the caisson and the suction cups.

9. In salvage equipment: the new system of connecting a lifting cable to a sunken vessel which comprises a trunk-plate coupled to the cable; and a gang of load-straps yoked together at their upper ends by the trunk-plate and applied perpendicularly in spaced relation upon the side of the vessel, the several straps being each secured to the underlying hull-plates by multiple bolts applied to lie at uniformly spaced intervals throughout the height of the strap.

10. As salvage equipment for use in raising a sunken vessel: the combination of a flexible lifting piece adapted to receive a plurality of bolts at given spaced intervals of the length for securing the piece to the hull-plates of the vessel; a submersible working caisson externally rigged with independently acting gangs of bolt-applying devices mounted for rotary and axial movement in the instance of each device and collectively disposed in a set pattern correlated to the given points at which the lifting piece is to be bolted; supports provided by the caisson acting to releasably engage the lifting piece to locate the piece in functional relation to the bolt-applying devices; means for attaching the caisson to the side of the vessel's hull to locate the supported lifting piece in functional relation to the hull; and mechanism operable from within the caisson to control the rotary and axial movements of said gangs of bolt-applying devices, the independency of said gangs permitting the lifting piece to be secured to the vessel by the act of first bolting the same by the use of one said gang and then, modifying the position of the caisson in relation to the hull and as may be required by the curvature of the latter, bolting the piece with another said gang.

11. As salvage equipment for use in raising a sunken vessel: the combination of a lifting piece adapted to receive bolts therethrough for securing the piece to the hull-plates of the vessel, and providing threaded sockets offset from given points at which the bolts are to be applied; a submersible working caisson externally rigged with the male counterpart of said sockets and which are mounted for rotary and axial movement and correlated as to position with the sockets of the lifting piece for detachably supporting the latter upon the caisson; rigging for applying the securing bolts also mounted for rotary and axial movement externally upon the caisson in functioning relation to the supported lifting piece; and mechanism operable from within the caisson to control the rotary and axial movements of said external rigging.

12. In a salvage operation, the method of securing lifting pieces to the side of a sunken vessel and given, as the securing means, tap-bolts functional to cut their own threads, consisting in holding the piece to be secured firmly against the side of the vessel, drilling registering holes through the piece and into the underlying hull-plates of the vessel and, in performing said drilling step, cutting the hole in the lifting piece to a diameter more than and in the underlying hull-plates to a diameter less than the diameter of the tap-bolts, working the tap-bolts through the drilled holes of the piece and causing the same to cut threads in the registering holes of the hull-plates, and screwing the tap-bolts home to clamp the piece against the hull.

13. As salvage equipment for use in raising a sunken vessel: a lifting pontoon having a depending cable presenting a terminal fitting formed to provide an eye and a surmounting haul-down collar; a plate adapted to be bolted upon the side of the vessel and formed with an apical eye arranged to register with the eye of said terminal fitting; a submersible working caisson; external rigging upon the caisson comprising a device for detachably engaging the haul-down collar, and a pin-carrying device positioned to obtain registration as between the pin and the eye of said terminal fitting upon engaging the haul-down collar in the first said device; and means controlled from within the caisson and arranged to be operated upon a registration of the last-named eye with the eye of the vessel-attached plate for axially advancing the pin to couple the terminal fitting to the plate.

14. The described equipment of claim 13, said assembly of plate, terminal fitting of the cable, and coupling pin providing means actuated by the pin-carrying device for locking the pin against axial dislodgment from its coupling position.

15. As a securing instrumentality for use in under-water operations to hold a piece of external rigging to a submersible body and admitting to disengagement from within the body to enable the rigging piece to be disengaged at will: a member arranged to be anchored by its outer end to the rigging piece, having a central shoulder arranged to bear upon the external wall of the body and connecting by a weakened shank with said anchoring end, and formed with a stem threaded upon its inner end and adapted to extend from the shoulder through the wall of the body into the interior of the latter, said threads of the stem acting to accommodate a clamping nut which, by backing the same off, permits the stem to be turned for twisting off said weakened shank.

16. Given multiple anchors, and a submersible buoyant caisson connected by respective and independently operable anchor lines to the several anchors, said caisson having a peak buoyancy sufficiently high to overcome the combined weights of the caisson and its anchors and admitting to a water-ballasting such as will reduce the buoyancy lift to a point where the same is below the combined weights of the anchors but above the weight of the caisson alone, the method of governing the under-water position of the water-ballasted caisson, both vertically and horizontally, and which comprises placing two sets of three or more anchors, one set for each side of the caisson, upon the sea-bottom to have the several anchors of a respective said set occupy positions approximately corresponding to the points of a triangle locating one angle in outwardly removed relation from a path of normal direct descent travelled by the caisson and its subtending side in paralleling relation to a perpendicular plane taken transverse to a line traversing the two sides of the caisson, and taking in or playing out the several anchor lines of the two sets of anchors as may be necessary to cause the caisson to responsively approach or recede from one or another said anchor, relatively speaking.

17. In salvage equipment, in combination: a submersible working caisson; a mounting rigidly supported upon the caisson to occupy a position external thereto; rotary means carried by said mounting to perform under-water functions of the caisson; means operable from within the caisson, extending through the wall of the latter and, externally of the caisson, operatively interconnected with the said rotary means for imparting rotation to the latter; and means operable from within the caisson for freeing the said rotary means from the operating means which extends through the wall thereto, and for disengaging the mounting from the caisson, thus to permit the said rotary means and its mounting to be discarded at will in the event of such parts becoming fouled in the under-water operations of the caisson.

18. Given a lifting strap produced to a length sufficient to span an appreciable part of the over-all height of the hull of a vessel, and which said strap has a flexibility characteristic sufficient, when the strap is applied to occupy an approximate perpendicular position, to admit of being readily bent to conform to the curve of the vessel's side, the said strap being arranged and adapted to be fixedly secured, in said conforming shape, to the hull of a sunken vessel, the method of making the strap conform and of securing the conforming strap which comprises descending to the side of the sunken vessel in a submersible working caisson, first pressing the top part of the strap by force derived from the caisson against the side of the vessel, and firmly anchoring this top part while it is held firmly by the caisson, and then lowering the caisson and repeating the procedure upon a lower length of the strap.

19. In salvage equipment: the new system of connecting a lifting cable to a sunken vessel which comprises a trunk-plate coupled to the cable; and a gang of load-straps yoked together at their upper ends by the trunk-plate and applied perpendicularly in spaced relation upon the side of the vessel, the load-straps being each produced to a length sufficient to span an appreciable part of the hull's over-all height and being made fast to the hull throughout substantially this entire span, functionally speaking, in order to effectuate a comparatively uniform distribution of the lift force within the length of the strap.

WALLACE L. NEWELL.